US012768737B2

(12) United States Patent
Song et al.

(10) Patent No.: US 12,768,737 B2
(45) Date of Patent: Oct. 20, 2026

(54) LIQUID-LEAKAGE DETECTION DEVICE

(71) Applicant: Shenzhen Envicool Technology Co., Ltd., Shenzhen (CN)

(72) Inventors: Chengsheng Song, Shenzhen (CN); Xianwen Ren, Shenzhen (CN)

(73) Assignee: Shenzhen Envicool Technology Co., Ltd., Longhua District (CN)

( * ) Notice: Subject to any disclaimer, the term of this patent is extended or adjusted under 35 U.S.C. 154(b) by 434 days.

(21) Appl. No.: 18/344,026

(22) Filed: Jun. 29, 2023

(65) Prior Publication Data

US 2024/0003773 A1 Jan. 4, 2024

(30) Foreign Application Priority Data

Jun. 29, 2022 (CN) ......................... 202221674461.3

(51) Int. Cl.
*G01M 3/16* (2006.01)
*G01M 3/18* (2006.01)

(52) U.S. Cl.
CPC .............. *G01M 3/165* (2013.01); *G01M 3/18* (2013.01)

(58) Field of Classification Search
CPC ........................ G01M 3/165; G01M 3/18–183
USPC ..................................................... 73/40, 40.5
See application file for complete search history.

(56) References Cited

U.S. PATENT DOCUMENTS 10,656,044 B1 * 5/2020 Kuo ...................... G01M 3/165
2009/0284382 A1 * 11/2009 Hill ...................... G01M 3/165 340/604
2016/0284193 A1 * 9/2016 Davis ..................... G08B 21/18
2019/0162625 A1 * 5/2019 Carr ...................... G01M 3/165

FOREIGN PATENT DOCUMENTS

DE 1704888 A1 11/1971
DE 202018101539 U1 4/2018
EP 2757359 B1 * 4/2017 ............ G01M 3/182
KR 20220005299 A * 1/2022 ............ G01M 3/223

OTHER PUBLICATIONS

Machine translation of EP 2757359 B1 (Year: 2014).*
Machine translation of KR 20220005299 (Year: 2022).*
Extended European Search Report mailed on Oct. 18, 2023, issued in the corresponding European Patent Application No. 23182107.5, 8 pages.

* cited by examiner

*Primary Examiner* — Nathaniel J Kolb
(74) *Attorney, Agent, or Firm* — IPkey PLLC

(57) ABSTRACT

A liquid-leakage detection device includes a detection belt body, an electrode, a first connection member and a second connection member. The detection belt body is configured to wrap an outer surface of a to-be-detected device. The electrode is configured to detect whether the to-be-detected device leaks liquid. The electrode is connected to the detection belt body and disposed on one surface or inside of the detection belt body. The first connection member connected to a first side of the detection belt body and includes at least one first buckling part. The second connection member is connected to a second side of the detection belt body and includes at least one second buckling part. The second buckling part is capable of buckling with the first buckling part so that the first connection member is connected to the second connection member by buckling.

13 Claims, 7 Drawing Sheets

LIQUID-LEAKAGE DETECTION DEVICE

CROSS-REFERENCE TO RELATED APPLICATIONS

The present application claims priority to Chinese Patent Application No. 202221674461.3, filed on Jun. 29, 2022, the content of which is incorporated herein by reference in its entirety.

TECHNICAL FIELD

The present disclosure relates to the technical field of liquid-leakage detection, and in particular, to a liquid-leakage detection device.

BACKGROUND

A pipe is an essential component in a process of liquid transportation. However, due to aging of the pipe, change of climate environment, and artificial damage, pipe leakage accidents occur from time to time. Moreover, pipes are mostly located inside a device, and operating environment thereof is relatively complex.

In the related art, in order to accurately detect the location of liquid-leakage of the pipe, liquid-leakage is detected by using an annular liquid-leakage detection sensor. The annular liquid-leakage detection sensor is wrapped by clamps and locking members on a periphery surface of the pipe that needs to detect liquid-leakage. The fixing manners of the related art at least has following problems: a worker need to assemble the clamps and locking members one by one when the liquid-leakage detection sensor is assembled, and a maintenance person need to disassemble all the locking parts before removing the liquid-leakage detection sensor in maintenance, causing low assembling and disassembling efficiency.

SUMMARY

In order to overcome the above problems in the related art, a main objective of the present disclosure is to provide a liquid-leakage detection device that can improve the assembling and disassembling efficiency.

In one aspect, the present disclosure provides a liquid-leakage detection device. The liquid-leakage detection device includes a detection belt body, an electrode, a first connection member and a second connection member. The detection belt body is configured to wrap an outer surface of a to-be-detected device. The electrode is configured to detect whether the to-be-detected device leaks liquid. The electrode is connected to the detection belt body and disposed on one surface or inside of the detection belt body. The first connection member connected to a first side of the detection belt body and includes at least one first buckling part. The second connection member is connected to a second side of the detection belt body and includes at least one second buckling part. The second buckling part is capable of buckling with the first buckling part so that the first connection member is connected to the second connection member by buckling.

In some embodiments, the first buckling part is at least one of three structures consisting of a hook, a protrusion, and a groove; and the second buckling part is at least one of three structures consisting of a hook, a protrusion, and a groove, and a shape and quantity of the second buckling part are set corresponding to a shape and quantity of the first buckling part.

In some embodiments, each of the first buckling part and the second buckling part is a hook structure; or the first buckling part is a protrusion structure, and the second buckling part is a groove structure; or the first buckling part is a groove structure, and the second buckling part is a protrusion structure.

In some embodiments, the first connection member further includes a first connecting portion connected to a first side of the detection belt body, the second connection member further includes a second connecting portion connected to a second side of the detection belt body, at least two second buckling parts are provided, and at least two first buckling parts are provided; the at least two first buckling parts are arranged on the first connecting portion along a length direction of the detection belt body, the at least two second buckling parts are arranged on the second connecting portion along the length direction of the detection belt body, and the first buckling part and the second buckling part are connected by buckling; or the at least two first buckling parts are arranged in parallel on the first connecting portion along a width direction of the detection belt body, the at least two second buckling parts are arranged in parallel on the second connecting portion along the width direction of the detection belt body, and the first buckling part and the second buckling part are connected by buckling.

In some embodiments, the first connection member and the second connection member are integrally formed with the detection belt body.

In some embodiments, the detection belt body has a thickness of 0.1 mm-5 mm; or the electrode has a thickness of 0.1 mm-2 mm, and a width of 0.1 mm-5 mm.

In some embodiments, the detection belt body includes a water absorbing material layer and/or a color developing material layer.

In some embodiments, at least two electrodes are provided, the at least two electrodes are spaced on one surface or inside of the detection belt body along a circumferential direction of the detection belt body upon wrapping the to-be-detected device, and a length of the at least two electrodes extends along length directions of the first connection member and the second connection member.

In some embodiments, the at least two electrodes extend along a predetermined geometric shape in a length direction of the detection belt body.

In some embodiments, the detection belt body is made of a thermoplastic material, and/or each of the first connection member and the second connection member is made of a thermoplastic material.

Compared to the prior art, the liquid-leakage detection device includes a detection belt body, an electrode, a first connection member and a second connection member. The detection belt body is configured to wrap an outer surface of a to-be-detected device. The electrode is configured to detect whether the to-be-detected device leaks liquid. The electrode is connected to the detection belt body and disposed on one surface or inside of the detection belt body. The first connection member connected to a first side of the detection belt body and includes at least one first buckling part. The second connection member is connected to a second side of the detection belt body and includes at least one second buckling part. The second buckling part is capable of buckling with the first buckling part so that the first connection member is connected to the second connection member by buckling. The detection belt body is wrapped around the outer surface of the to-be-detected device when the liquid-leakage detection device is assembled, making the first buckling part and the second buckling part buckle with each other, and the first buckling part and the second buckling part can be unzipped when the liquid-leakage detection device is dissembled, so as to effectively improving the assembling and disassembling efficiency.

REFERENCE SIGNS

Figure 1:
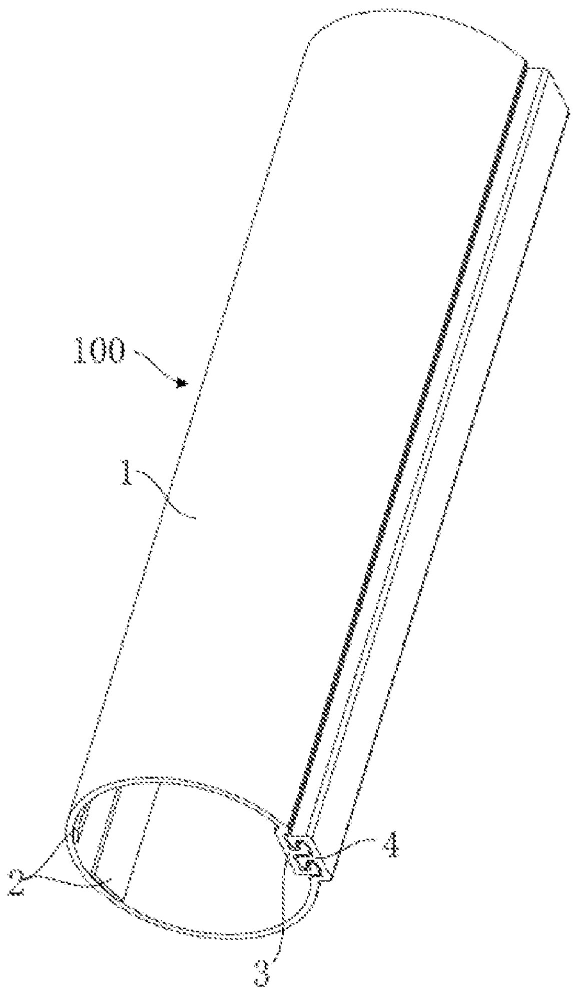
FIG. 1 is a perspective view of a liquid-leakage detection device according to an embodiment of the present disclosure.

1: detection belt body; 2: electrode; 3: first connection member; 31: first buckling part; 32: first connecting portion; 4: second connection member; 41: second buckling part; 42: second connecting portion; 100: liquid-leakage detection device.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the accompanying drawings. It should be understood that the embodiments described here are intended to explain the present disclosure and not to limit it.

The terms "first" and "second" in the present disclosure are only used for a purpose of description and cannot be understood as indicating or implying relative importance, unless noted otherwise. Unless noted otherwise, the term "multiple" refers to two or more. The terms "connection" and "fixation" should be understood in a broad sense. For example, "connection" can be a fixed connection, a removable connection, an integrated connection, or an electrical connection. And "connection" can be directly connected or indirectly connected through an intermediate. For those skilled in the art, the meanings of the above terms in the present disclosure can be understood based on particular circumstances.

It should be understood that the directional terms "above" and "below" described in the present disclosure are described from the view angle of the drawings and should not be understood as limiting the embodiments of the present disclosure. In addition, in the context, it should be understood that when one element is connected "above" or "below" another element, the one element can not only be directly connected "above" or "below" another element, but also indirectly connected "above" or "below" another element through an intermediate.

Limited to the requirements of detection environment and reliability, most liquid-leakage detection solutions in the related art use passive detection. A sensor detects a signal change to prompt the liquid-leakage alarm only if the liquid comes into contact with the sensor. It is more suitable for large industrial occasions such as traditional factories, oil depots, and long-distance pipes. When the leaked liquid is found, even if it has been leaking for a certain period of time, the losses are within a controllable range, leading to lower detection requirements and higher requirements for sensor durability and reliability, and requiring adaptation to different harsh operating conditions. Moreover, due to the detection liquids in the past were generally liquids with high conductivity such as acid or base liquids, once a liquid-leakage occurs, the amount of leaked liquid is large. The detection requirements and difficulty are not high. And the electromagnetic environment is relatively simple, and the sensor is less disturbed.

At present, the liquid-leakage detection solution for pipes with complex operating conditions (for example, pipes with small outer diameters and complex structures) is still in an immature state. The materials and structures of pipes are complex and diverse, and the types of flowing liquids are also diverse, bringing great difficulty and challenges to detection performance and reliability of liquid-leakage detection.

The liquid-leakage detection manners in the related art include: 1) after collecting the leaked liquid by a water collecting tray or a water receiving tray, the impedance of a point sensor after contact with the leaked liquid or the electrical/optical signal changes generated by light refraction are used to sense the leaked liquid; 2) the leaked liquid is detected by using a liquid-leakage detection rope or a liquid-leakage detection belt, mainly used for large plane spaces, such as ground, bottom of equipment, and underground pipelines. Its detection principle is to use leaked liquid to contact with a water immersion rope, causing changes in the impedance or capacitance of the sensing cable; 3) liquid-leakage detection is performed by using optical signals, and a liquid-leakage detection fiber contacts the surface of the fiber through light, causing the optical signal to refract at the leakage point, thereby realizing the liquid-leakage detection by detecting the signal changes at the receiving end; and 4) liquid-leakage detection is performed by RFID technology. Its detection principle is that by using the characteristic that the capacitance of the detected liquid is significantly greater than the air, the transmission of ultra-high frequency signals can be affected by the liquid contacted, realizing liquid-leakage detection.

For the first detection method mentioned above, the detection is centralized, so as to avoid false alarm interference. However, a large amount of leakage generally has occurred when leaked liquid is sensed, causing significant losses, and the first detection method is not suitable for the current demand for liquid-leakage detection. For the second detection method mentioned above, the leakage is detected by the impedance or capacitive reactance changes after the liquid comes into contact with the sensing rope, and the characteristic is that the sensing rope is wrapped around the pipe. However, the second detection method cannot detect all positions due to the small diameter and soft material required by the sensing rope, and the assembling and fixation are complex, affecting the detection effect. For the third detection method mentioned above, the cost of detectors and sensors is significantly higher than other detection methods, and fiber optic liquid-leakage detection has high requirements for pipe assembling. And for the fourth detection method mentioned above, wireless detection can be achieved, but the existing technology still faces problems such as high power consumption, high cost, high interference, and poor detection efficiency.

As mentioned above, the existing liquid-leakage detection method has the following defects: the response of liquid-leakage detection is slow and the probability of false alarms is high, affecting the accuracy of liquid-leakage detection. The liquid-leakage detection sensor can only cover relatively simple parts of the structure and cannot cover all leakage points. The space of the secondary liquid cooled side structure is narrow, making it difficult to assemble and disassemble, and affecting efficiency and sensor accuracy. At present, liquid-leakage detection can only realize leakage alarm, but cannot deal with leaked liquid immediately. And leakage points are difficult to detect, and maintenance and analysis take a long time.

Figure 2:
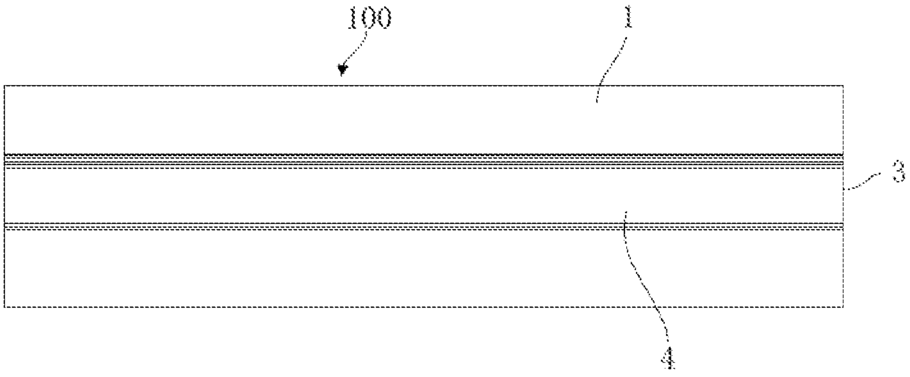
FIG. 2 is a front view of the liquid-leakage detection device shown in FIG. 1.
Figure 3:
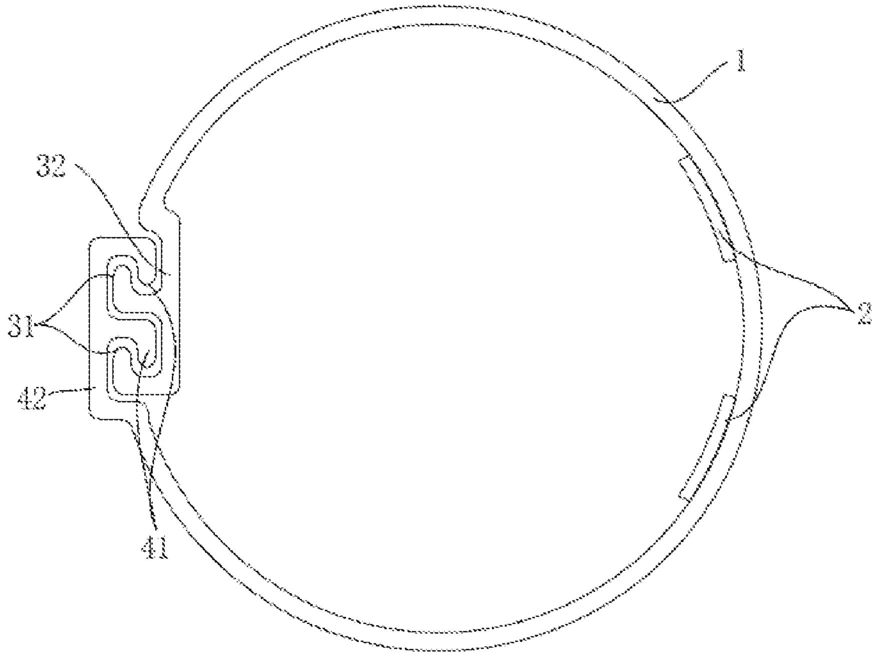
FIG. 3 is a right view of the liquid-leakage detection device shown in FIG. 1.
Figure 4:
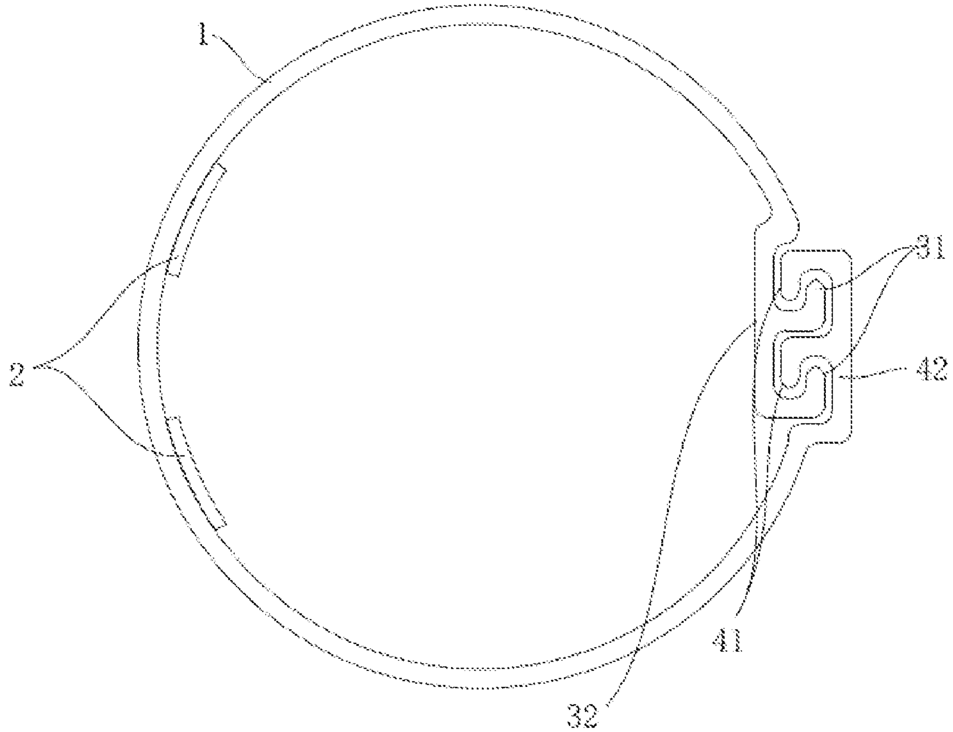
FIG. 4 is a left view of the liquid-leakage detection device shown in FIG. 1.
Figure 5:
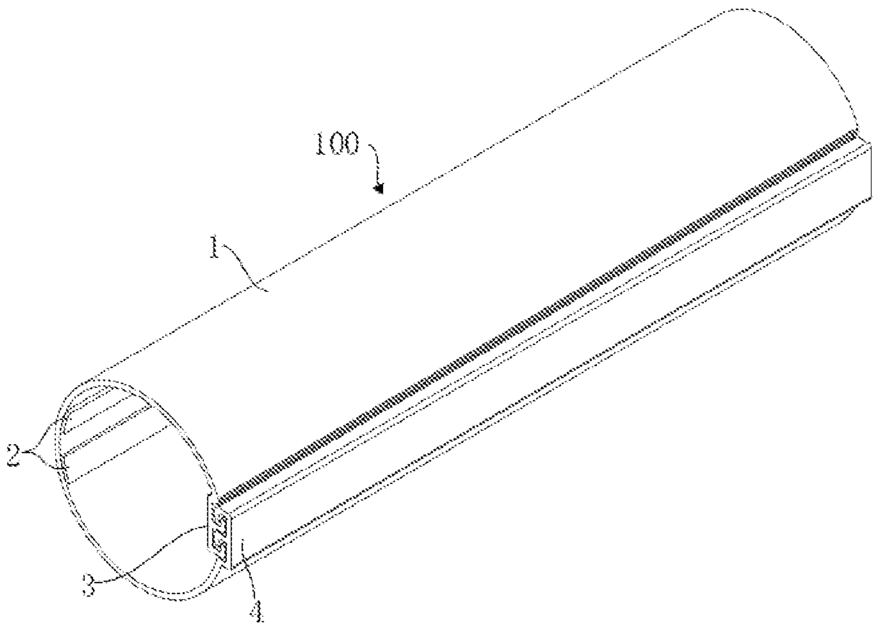
FIG. 5 is a perspective view of a liquid-leakage detection device according to another embodiment of the present disclosure.
Figure 6:
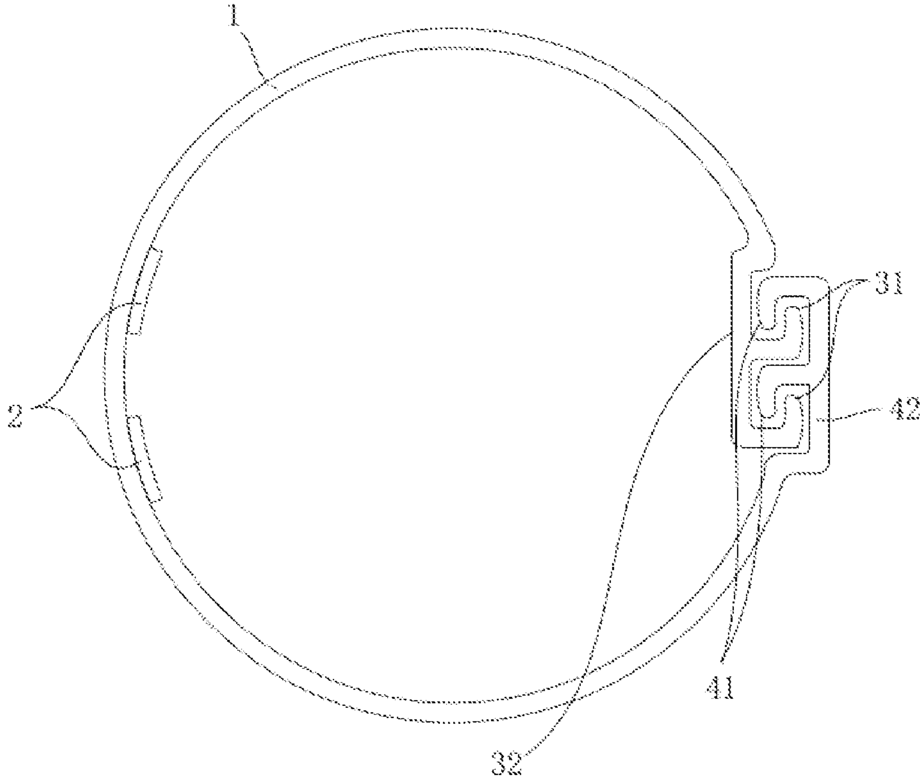
FIG. 6 is a left view of the liquid-leakage detection device shown in FIG. 5.
Figure 7:
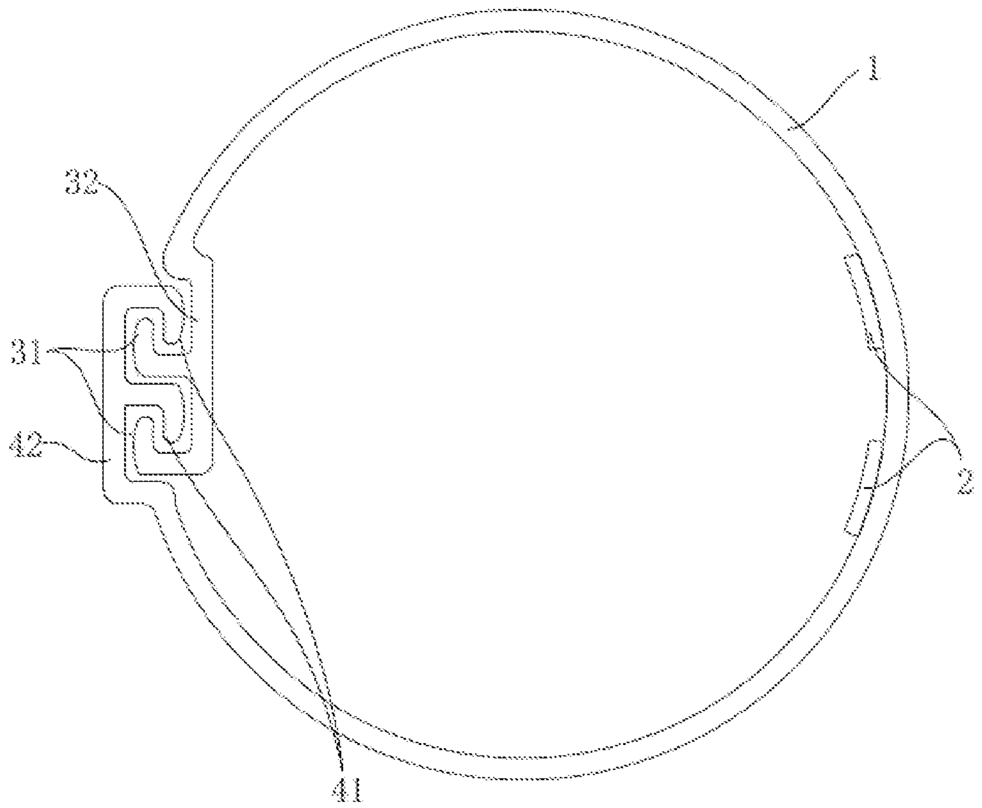
FIG. 7 is a right view of the liquid-leakage detection device shown in FIG. 5.
Figure 8:
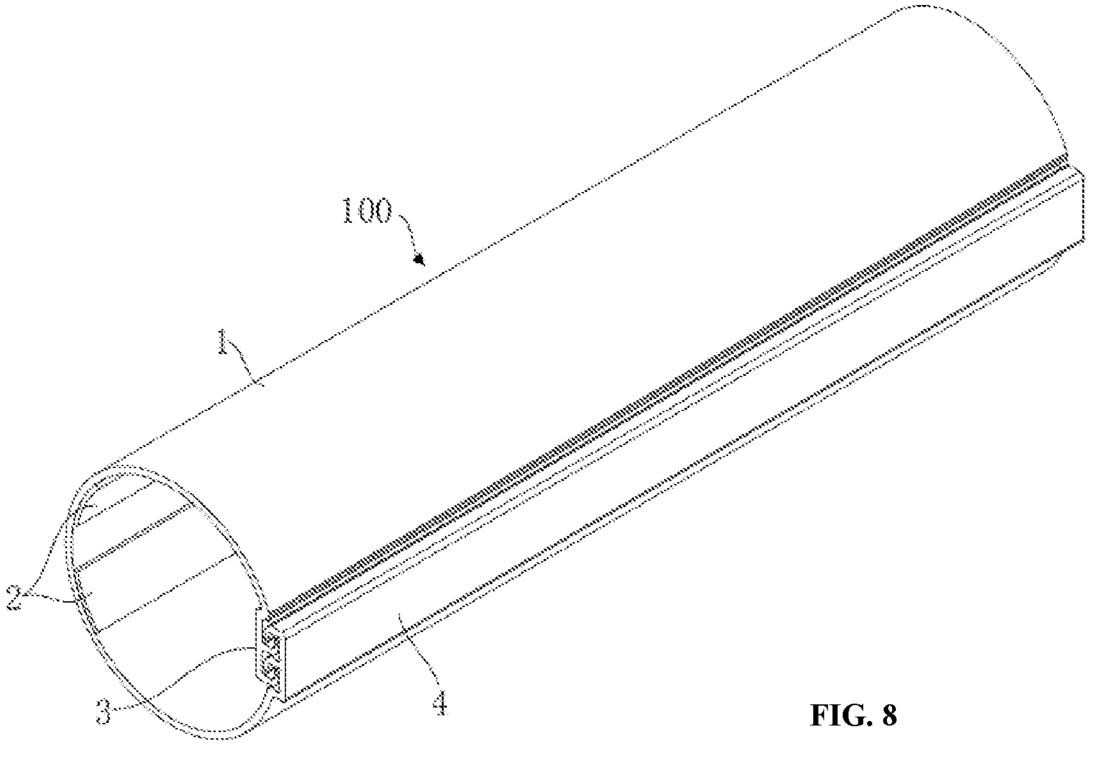
FIG. 8 is a perspective view of a liquid-leakage detection device according to another embodiment of the present disclosure.
Figure 9:
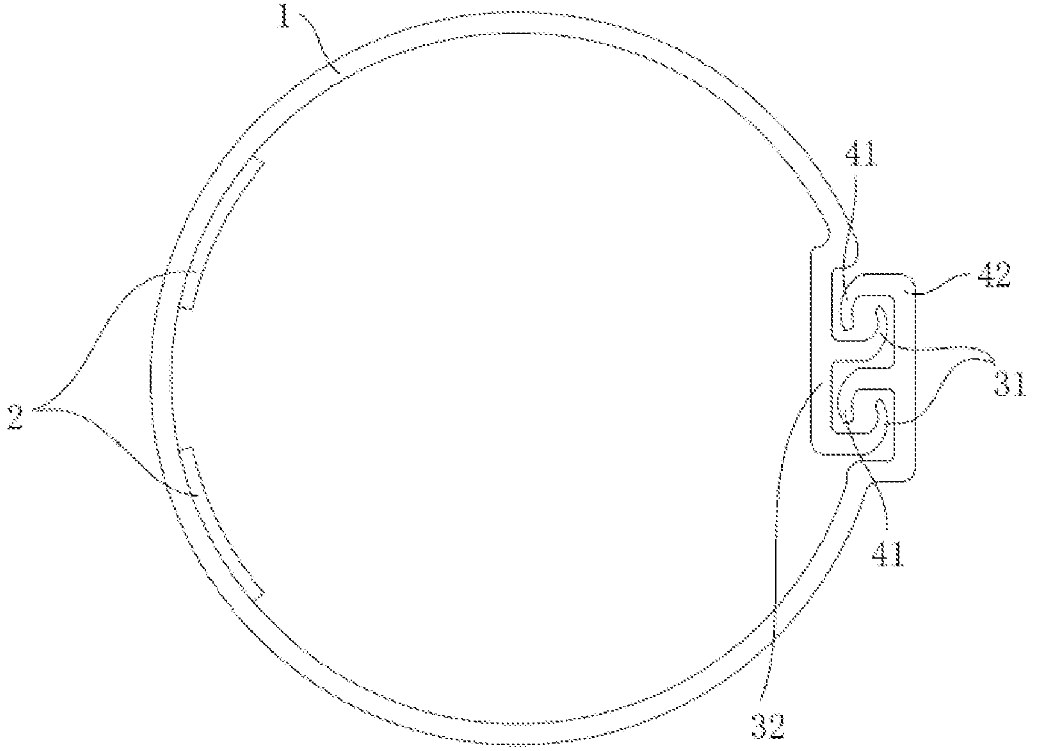
FIG. 9 is a left view of the liquid-leakage detection device shown in FIG. 8.
Figure 10:
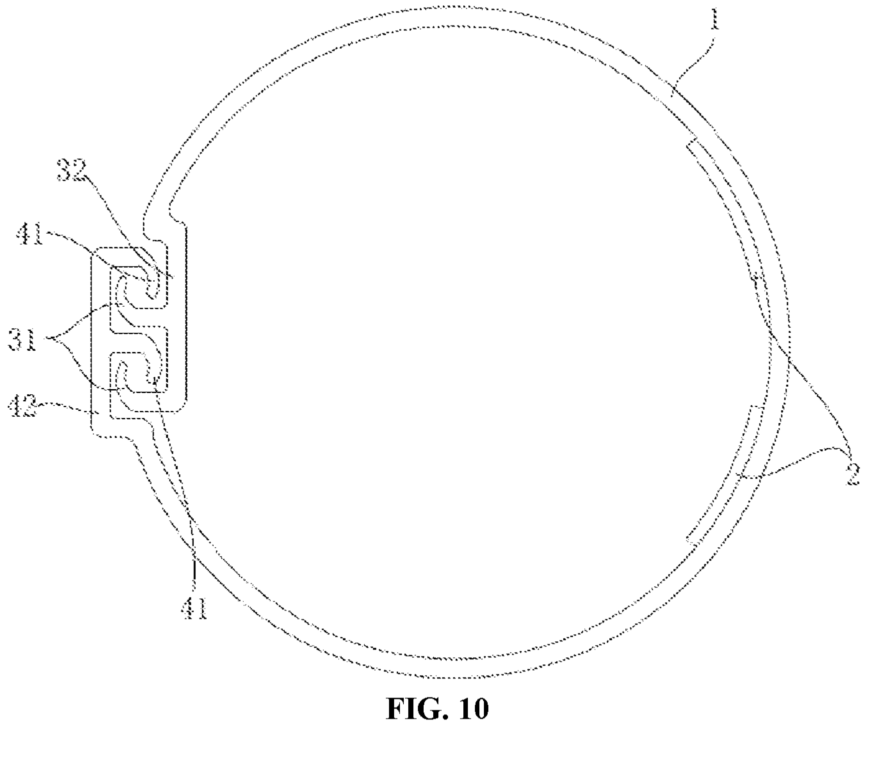
FIG. 10 is a right view of the liquid-leakage detection device shown in FIG. 8.
Figure 11:
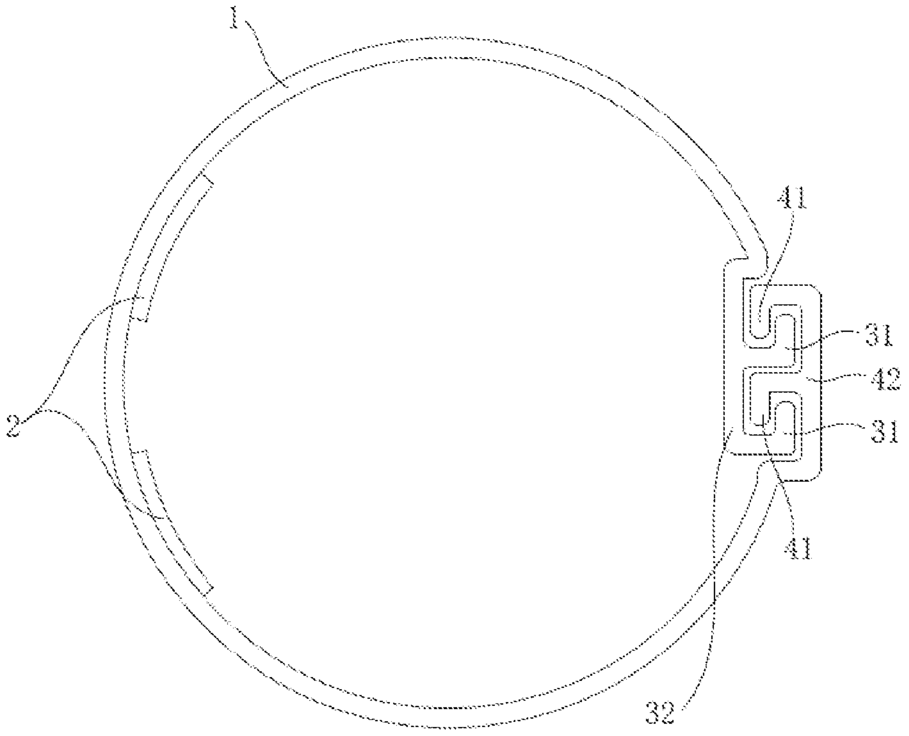
FIGS. 11-14 are a side view of a liquid-leakage detection device according to some embodiments of the present disclosure, respectively.

Referring to FIG. 1 to FIG. 4, FIG. 1 is a perspective view of a liquid-leakage detection device according to the embodiment of the present disclosure, FIG. 2 is a front view of the liquid-leakage detection device shown in FIG. 1, FIG. 3 is a right view of the liquid-leakage detection device shown in FIG. 1, and FIG. 4 is a left view of the liquid-leakage detection device shown in FIG. 1. The liquid-leakage detection device 100 includes a detection belt body 1, an electrode 2, a first connection member 3 and a second connection member 4. The detection belt body 1 is configured to wrap the outer surface of the to-be-detected device. The electrode 2 is connected to the detection belt body 1 and provided on one surface or inside of the detection belt body 1, so as to detect whether the to-be-detected device leaks liquid. The first connection member 3 is connected to a first side of the detection belt body 1, and the second connection member 4 is connected to a second side of the detection belt body 1 so as to connect with the first connection member 3. The first connection member 3 is connected to the second connection member 4 by buckling.

In this embodiment, the first connection member 3, the second connection member 4, and the detection belt body 1 are integrally formed. In some embodiments, the first connection member 3, the second connection member 4, and the detection belt body 1 can be formed separately, and then assembled together, for example, they can be connected together by bonding or sewing.

When detecting whether a to-be-detected pipe leaks liquid, the detection belt body 1 is wrapped on an outer surface of the to-be-detected device, and the first connection member 3 is connected to the second connection member 4 by buckling, so that the detection belt body 1 can be fixedly wrapped on the outer surface of the to-be-detected device, and the electrode 2 can be tightly bonded to the outer surface of the to-be-detected device. When the to-be-detected device leaks liquid, the leaked liquid contacts with the electrode 2 to cause a change in the impedance of the electrode 2, so that whether the to-be-detected device leaks liquid can be determined based on the impedance change of the electrode 2, thereby achieving a high detection speed, and comprehensively detecting various leakage points of the pipe.

In this embodiment, the first connection member 3 includes multiple first buckling parts 31, and the second connection member 4 includes multiple second buckling parts 41. The shape and quantity of the second buckling part 41 correspond to the shape and quantity of the first buckling part 31, respectively, so that the second buckling parts 41 can buckle the first buckling parts 31, respectively, thereby realizing buckling connection between the first connection member 3 and the second connection member 4. The first buckling part 31 can be at least one of three structures consisting of a hook, a protrusion, and a groove, and the second buckling part can be at least one of three structures consisting of a hook, a protrusion, and a groove. In this embodiment, the first buckling part 31 and the second buckling part 41 are both a hook structure.

In this embodiment, the first buckling part 31 and the second buckling part 41 can buckle together by means of buckling or pulling to form a stable hand-to-hand hooked structure. The stable structure has high strength and can still be fixed to each other even under hard pulling of different angles or directions, so that the detection belt body 1 can be stably wrapped on the outer surface of the to-be-detected device. Meanwhile, when the liquid-leakage detection device is assembled, the detection belt body is wrapped around the outer surface of the to-be-detected device to buckle the first buckling part with the second buckling part. When the liquid-leakage detection device is disassembled, the first buckling part and the second buckling part can be pulled apart, so that it is very easy to assemble and disassemble.

When the buckling of the first buckling part 31 and the second buckling part 41 is realized, the buckling can be performed in a manner of a chain joint tool or pressing. After buckling, excellent bonding strength can be realized, liquid can be prevented from flowing through the groove between the first buckling part and the second buckling part, so that they have waterproof function and maintain a pressure of 3 bar or more without leakage.

Figure 12:
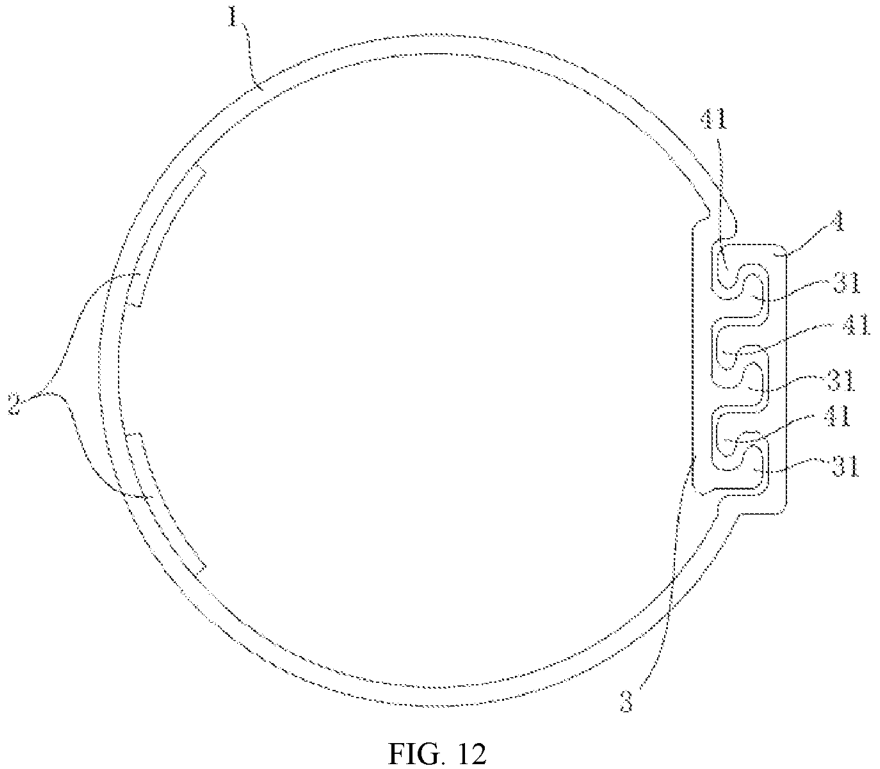

Further, the structures of the first buckling part 31 and the second buckling part 41 are not limited to the structures shown in FIG. 3 and FIG. 4, which can further be other structures, such as those shown in FIG. 5 to FIG. 11. Moreover, the quantities of the first buckling part 31 and the second buckling part 41 can be 2 or more (as shown in FIG. 12), respectively, to meet different requirements of strength and leakage prevention. The quantities of first buckling part and second buckling part can be only one, respectively.

Further, the first connection member 3 further includes a first connecting portion 32 connected to a first side of the detection belt body 1. The second connection member 4 further includes a second connecting portion 42 connected to a second side of the detection belt body 1. In this embodiment, the first buckling part 31 is arranged in parallel on the first connecting portion 32 along a width direction of the detection belt body 1, and the second buckling part 41 is arranged in parallel on the second connecting portion 42 along the width direction of the detection belt body 1. The first buckling part 31 and the second buckling part 41 are connected by buckling. In other embodiments, it can be understood that the first buckling parts are spaced on the first connecting portion along the length direction of the detection belt body, and the second buckling parts are spaced on the second connecting portion along the length direction of the detection belt body, and the first buckling parts and the second buckling parts are connected by buckling, respectively. In order to improve the wrapping effect of the detection belt body 1 on the to-be-detected device, the detection belt body 1 has the characteristics of softness, transparency, and ultra-thinness. The detection belt body 1 can be quickly assembled and fixed by a zipper structure, making it convenient to use and highly reliable.

Further, the width of the detection belt body 1 is slightly larger than the circumference of the pipe at its outer diameter, its size has a greater flexibility. Different sizes can be selected for pipes having different outer diameters. The thickness of detection belt body 1 ranges from 0.1 mm to 5 mm, e.g., 0.1 mm, 0.5 mm, 1 mm, 1.5 mm, 2 mm, 2.5 mm, 3 mm, 3.5 mm, 4 mm, 4.5 mm, or 5 mm, which can be other values within the above range, there is no limit here.

The materials of the detection belt body 1 includes a flame retardant, so as to avoid the occurrence of fires due to spontaneous combustion. In an embodiment, the materials of the detection belt body 1, the first connection member 3, and the second connection member 4 includes a thermoplastic material, respectively. For example, the materials of the detection belt body 1 can include polyvinyl chloride (PVC), thermoplastic polyurethanes (TPU), polyethylene terephthalate (PET), polycarbonate (PC), fluorinated ethylene propylene (FEP), polytetrafluoroethylene (PTFE), Polyvinylidenefluoride (PVDF), or Polyfluoroalkoxy (PFA). The materials of the first connection member 3 and the second connection member 4 can include PVC, TPU, PET, PC, FEP, PTFE, PVDF, or PFA, respectively.

To facilitate maintenance, the detection belt body 1 includes a water absorbing material layer and a color developing material layer. When liquid leakage occurs in pipe, the detection belt body 1 can adsorb the leaked liquid and display the leakage position for maintenance.

Multiple electrodes 2 are connected to one another and divided into positive electrodes and negative electrodes. In an embodiment, multiple electrodes 2 are spaced on one surface or inside of the detection belt body 1 along a circumferential direction of the detection belt body 1 wrapping the to-be-detected device, so that there is no contact between two adjacent electrodes 2. The length direction of each electrode 2 extends along the length direction of the first connection member 3 and the second connection member 4, to be consistent with the length of the detection belt body. The electrode 2 can be fixed to the detection belt body 1 by means of hot pressing, bonding, or printing, in which the hot pressing process does not affect electrode 2.

In this embodiment, due to the tensile resistance and bending resistance of the electrode 2, whether the pipe leaks liquid is detected through the electrode 2, so that the liquid-leakage detection device has high reliability.

Further, the materials of electrode 2 include a conductive ink, a metal alloy, a conductive cloth, a conductive foam, and a conductive foam. The cross-sectional shape of the electrode 2 is flat and extends along a predetermined geometric shape in the length direction of the detection belt body 1, e.g., it can be long strip shape, S-shape, or other shape according to different requirements. The thickness of the electrode 2 is 0.1 mm to 2 mm, e.g., 0.1 mm, 0.3 mm, 0.7 mm, 0.9 mm, 1.1 mm, 1.3 mm, 1.5 mm, 1.7 mm, or 2 mm. The width of electrode 2 is to 5 mm, e.g., 0.1 mm, 0.5 mm, 1 mm, 1.5 mm, 2 mm, 2.5 mm, 3 mm, 3.5 mm, 4 mm, 4.5 mm, or 5 mm, which can further be other values within the above range, and there is no limit here.

In some embodiments, the liquid-leakage detection device may further include multiple detection belt bodies. The detection belt body is provided with an electrode, a first connecting member, and a second connecting member. Two ends of the detection belt body are connected to other detection belt bodies through a connector or a lead wire.

The liquid-leakage detection device of the present disclosure has a high detection speed and can comprehensively detect various leakage points in the pipe. Meanwhile, when the pipe leaks liquid, the liquid-leakage detection device can further prevent the liquid from leaking out and avoid damage to servers or other electrical facilities. In addition, the liquid-leakage detection device is easy to assemble and the disassembling operation can be performed independently of the pipe.

Figure 13:
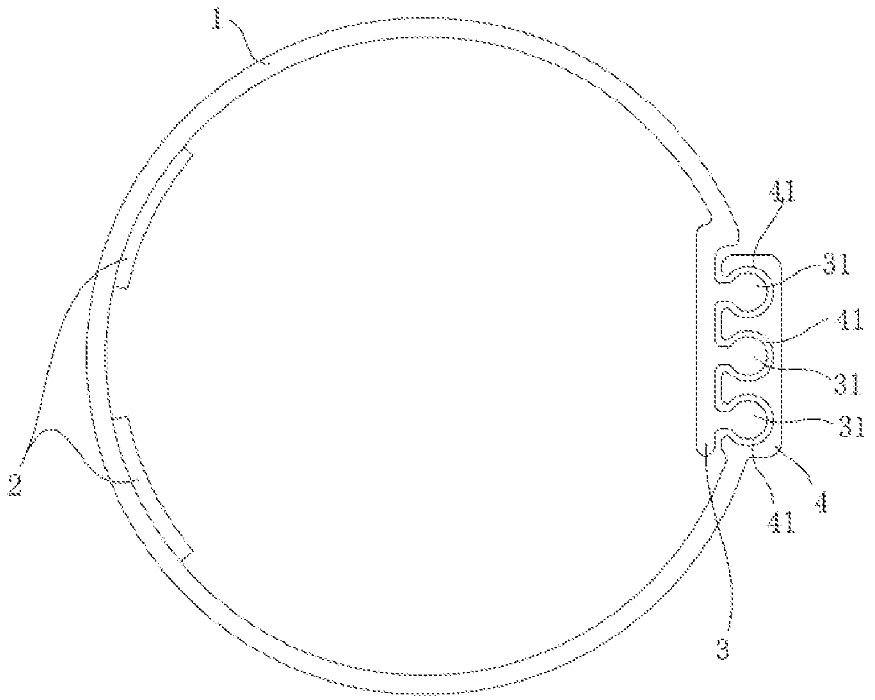

The present disclosure further provides another embodiment based on the above embodiment. This embodiment differs from the above embodiment that, as shown in FIG. 13, in this embodiment, any of the first buckling parts 31 can be a protrusion structure, and any of second buckling parts 41 can be a groove structure. The second buckling part 41 being the groove structure is arranged corresponding to the first buckling part 31 being the protrusion structure, so that the first buckling part 31 can be buckled with the second buckling part 41, realizing buckling connection between the first connection member 3 and the second connection member 4.

In other embodiments, it can be understood that any of the first buckling parts can be a groove structure, and any of the second buckling part can be a protrusion structure. The second buckling part being the protrusion structure is arranged corresponding to the first buckling part being the groove structure, so that the second buckling part can be buckled with the first buckling part 31, realizing buckling connection member between the first connection member and the second connection member.

Figure 14:
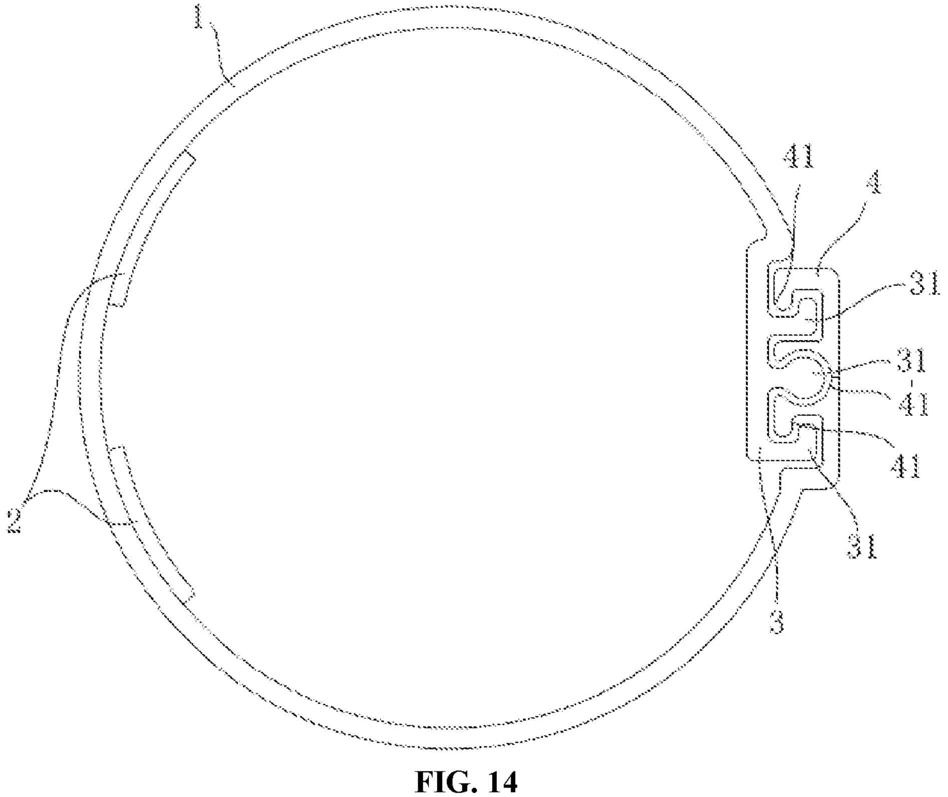

The present disclosure further provides another embodiment based on the above embodiment. This embodiment differs from the above embodiment that, as shown in FIG. 14, in this embodiment, part of the first buckling parts 31 can be a hook structure, and part of the first buckling parts 31 can be a protrusion structure. Part of the second buckling parts 41 can be a hook like structure, and part of the second buckling parts 41 can be a groove structure. The second buckling part 41 being the hook structure is arranged corresponding to the first buckling part 31 being the hook structure, and the second buckling part 41 being the groove structure is arranged corresponding to the first buckling part 31 being the protrusion structure, so that the second buckling part 41 can buckle with the first buckling part 31, realizing buckling connection between the first connection member 3 and the second connection member 4.

In some embodiments, it can be understood that part of the first buckling parts can be a hook structure, and part of the first buckling parts can be a groove structure. Part of the second buckling parts can be a hook structure, and part of the second buckling parts can be a protrusion structure. The second buckling part being the hook structure is arranged corresponding to the first buckling part being the hook structure, and the second buckling part being the protrusion structure is arranged corresponding to the first buckling part being the groove structure, so that the second buckling part can buckle with the first buckling part, realizing buckling connection between the first connection member and the second connection member.

The present disclosure realizes the buckling connection between the first connection member 3 and the second connection member 4 by means of buckling the first buckling part with the second buckling part, and has the advantages of compact structure, high strength, and ease use.

The liquid-leakage detection device of the present disclosure has following advantages: the liquid-leakage detection device can quickly detect liquid-leakage even with small amounts of liquid, and predict the leakage situation. The liquid-leakage detection device can comprehensively detect liquid-leakage, taking into account each internal liquid-leakage risk point and liquid-leakage direction. The liquid-leakage detection device is easy to assemble and maintain, so as to quickly maintain and put into use again. The liquid-leakage detection device has high reliability, low false alarm probability and long service life. The liquid-leakage detection device has a certain plugging ability which can give the maintenance personnel response time and processing time to avoid loss expansion. The liquid-leakage detection device can be quickly maintained to quickly find problems by displaying leakage points on site, and the liquid-leakage detection device can quickly remove the leaked liquid, shortening the maintenance time.

The above is merely representative embodiments of the present disclosure, but the protection scope of the present disclosure is not limited to these embodiments. Any changes or substitutions easily conceived by a person skilled in the art within the protection scope of the present disclosure should fall within the protection scope of the present disclosure. Therefore, the protection scope of the present disclosure should be based on the protection scope of the claims.

What is claimed is:

1. A liquid-leakage detection device, comprising:

a detection belt body configured to wrap an outer surface of a to-be-detected device;

an electrode configured to detect whether the to-be-detected device leaks liquid, wherein the electrode is connected to the detection belt body and disposed on one surface or inside of the detection belt body;

a first connection member connected to a first side of the detection belt body and comprising at least one first buckling part; and a second connection member connected to a second side of the detection belt body and comprising at least one second buckling part, wherein the second buckling part is capable of buckling with the first buckling part so that the first connection member is connected to the second connection member by buckling, wherein part or all of the at least one first buckling part is a hook structure arranged along a length direction of the detection belt body, part or all of the at least one second buckling part is a hook structure arranged along the length direction of the detection belt body, a shape and quantity of the at least one second buckling part are set corresponding to a shape and quantity of the at least one first buckling part, and the hook structure of the at least one first buckling part and the hook structure of the at least one second buckling part are capable of buckling together to form a stable interlocking structure without liquid-leakage.

2. The liquid-leakage detection device according to claim 1, wherein part of the at least one first buckling part is a hook structure and part of the at least one second buckling part is a hook structure, an other part of the at least one first buckling part is a protrusion structure, and the other part of the at least one second buckling part is a groove structure; or the other part of the at least one first buckling part is a groove structure, and the other part of the at least one second buckling part is a protrusion structure.

3. The liquid-leakage detection device according to claim 2, wherein at least two electrodes are provided, the at least two electrodes are spaced on one surface or inside of the detection belt body along a circumferential direction of the detection belt body upon wrapping the to-be-detected device, and a length of the at least two electrodes extends along length directions of the first connection member and the second connection member.

4. The liquid-leakage detection device according to claim 1, wherein the first connection member further comprises a first connecting portion connected to the first side of the detection belt body, the second connection member further comprises a second connecting portion connected to the second side of the detection belt body, at least two second buckling parts are provided, and at least two first buckling parts are provided;

the at least two first buckling parts are arranged on the first connecting portion along the length direction of the detection belt body, the at least two second buckling parts are arranged on the second connecting portion along the length direction of the detection belt body, and the first buckling part and the second buckling part are connected by buckling; or the at least two first buckling parts are arranged in parallel on the first connecting portion along a width direction of the detection belt body, the at least two second buckling parts are arranged in parallel on the second connecting portion along the width direction of the detection belt body, and the first buckling part and the second buckling part are connected by buckling.

5. The liquid-leakage detection device according to claim 4, wherein at least two electrodes are provided, the at least two electrodes are spaced on one surface or inside of the detection belt body along a circumferential direction of the detection belt body upon wrapping the to-be-detected device, and a length of the at least two electrodes extends along length directions of the first connection member and the second connection member.

6. The liquid-leakage detection device according to claim 1, wherein the first connection member and the second connection member are integrally formed with the detection belt body.

7. The liquid-leakage detection device according to claim 6, wherein at least two electrodes are provided, the at least two electrodes are spaced on one surface or inside of the detection belt body along a circumferential direction of the detection belt body upon wrapping the to-be-detected device, and a length of the at least two electrodes extends along length directions of the first connection member and the second connection member.

8. The liquid-leakage detection device according to claim 1, wherein the detection belt body has a thickness of 0.1 mm-5 mm; or the electrode has a thickness of 0.1 mm-2 mm, and a width of 0.1 mm-5 mm.

9. The liquid-leakage detection device according to claim 1, wherein the detection belt body comprises at least one of a water absorbing material layer or a color developing material layer.

10. The liquid-leakage detection device according to claim 1, wherein at least two electrodes are provided, the at least two electrodes are spaced on one surface or inside of the detection belt body along a circumferential direction of the detection belt body upon wrapping the to-be-detected device, and a length of the at least two electrodes extends along length directions of the first connection member and the second connection member.

11. The liquid-leakage detection device according to claim 10, wherein the at least two electrodes have a long strip shape or S-shape.

12. The liquid-leakage detection device according to claim 1, wherein at least two electrodes are provided, the at least two electrodes are spaced on one surface or inside of the detection belt body along a circumferential direction of the detection belt body upon wrapping the to-be-detected device, and a length of the at least two electrodes extends along length directions of the first connection member and the second connection member.

13. The liquid-leakage detection device according to claim 1, wherein at least one of the detection belt body, the first connection member, or the second connection member is made of a thermoplastic material.

* * * * *